United States Patent Office 2,714,259
Patented Aug. 2, 1955

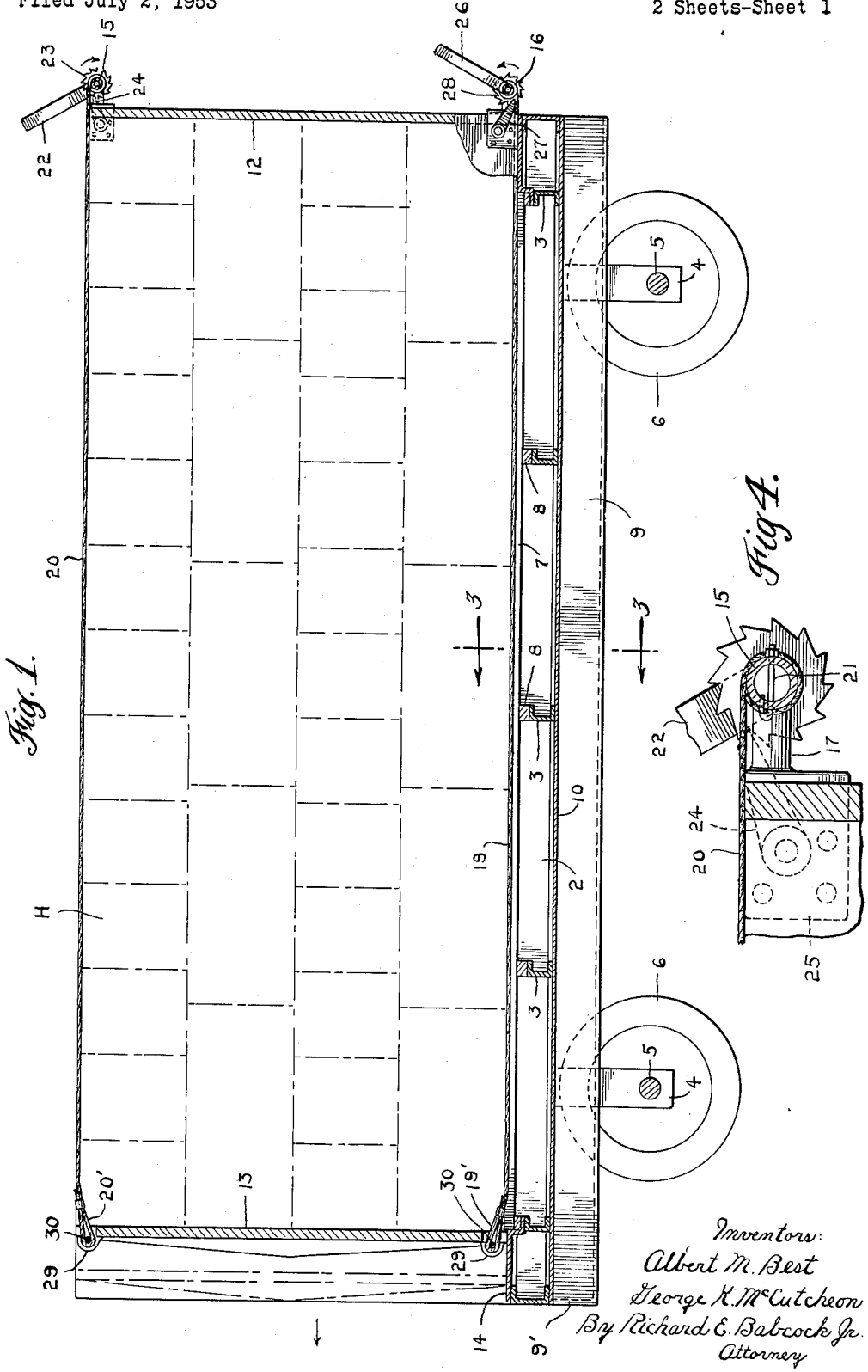

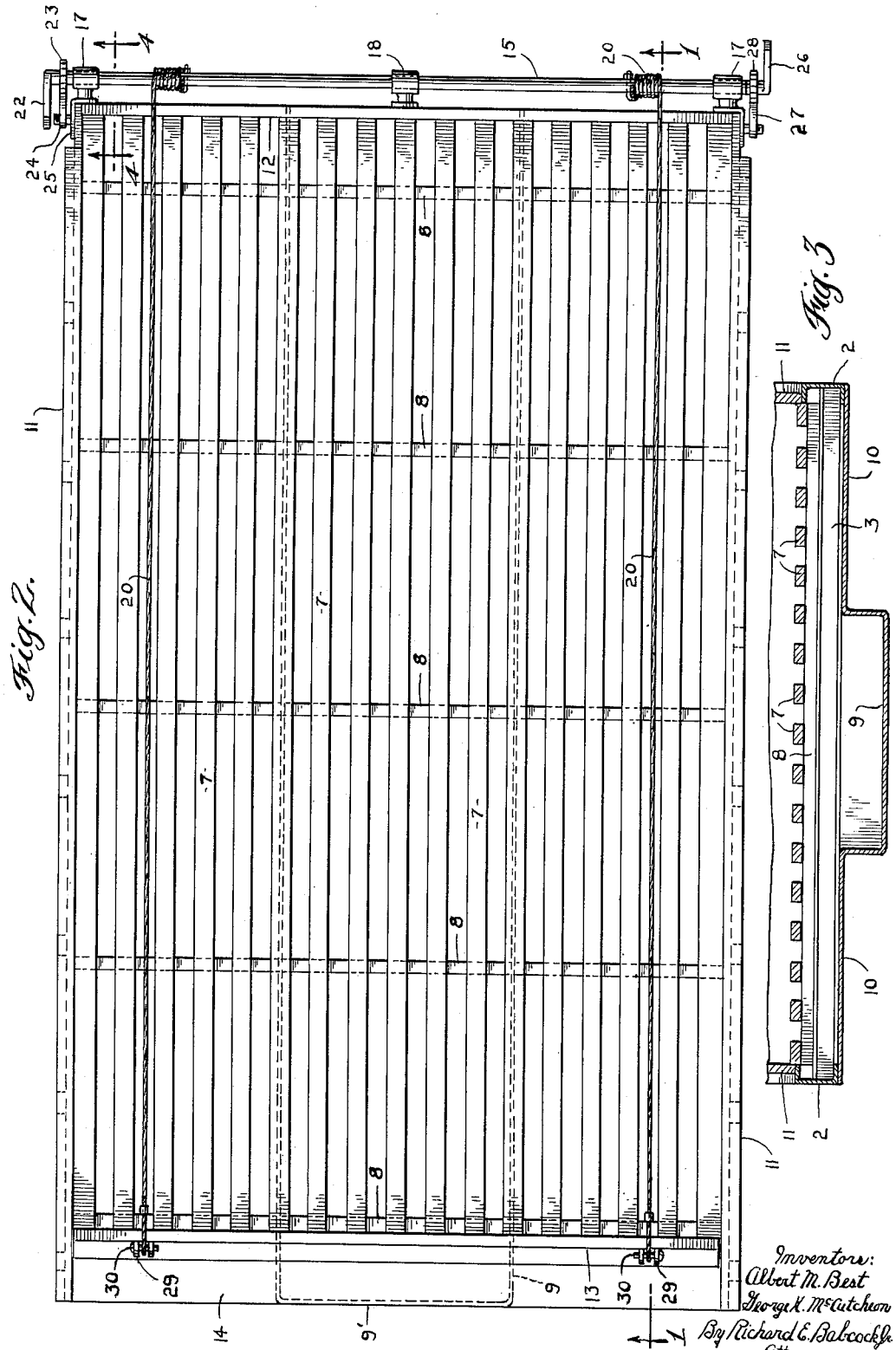

2,714,259

DRIER

Albert M. Best and George K. McCutcheon, New Holland, Pa., assignors to The Sperry Corporation, New Holland, Pa., a corporation of Delaware Application July 2, 1953, Serial No. 365,723

8 Claims. (Cl. 34—233)

This invention relates to a crop drying apparatus and a process of drying crop material and the like. While the apparatus and process are both particularly adapted for use in the drying of baled hay, they are by no means limited to such specific use.

It has heretofore been known to dry baled hay and other crop materials by placing same in a drying chamber and forcing air or other drying agents through such chamber and the material therein. However in attempting to dry baled hay and the like in such manner it has been found that even though the bales of hay are arranged in closely adjoining or contiguous relationship in the chamber, the air or other drying agent takes the path of least resistance and thus for the most part passes through the interstices between the respective bales and does not pass through the substantially densely packed bales in the volume that is necessary and desirable in order to effect an efficient drying action on the baled material.

With the foregoing in mind, we have conceived a new and advantageous process of drying the hay or other material by compressing it in a predetermined plane to eliminate or at least greatly minimize the combined size of the interstices between the respective bales, while simultaneously forcing air or some other drying agent through the hay transversely to such predetermined plane of compression, at the same time preventing the escape of the air from the hay in directions parallel to said plane. More specifically the process of the invention comprises supporting the bales of hay on a horizontal foraminous surface, laterally compressing such hay and while holding it thus compressed forcing air vertically through the foraminous surface and the hay thereon, at the same time preventing the lateral escape of air from the hay. It will be apparent that by such method or process it is possible to substantially prevent the passage of air through the itnerstices between the bales of hay and thus force it to pass through the said bales in order to exert an improved drying action.

It is also an important object of the invention to provide a novel and simple apparatus for carrying out the foregoing process. To this end the apparatus of the invention comprises a suitable drying chamber with means for compressing the material in the chamber in a predetermined plane, while preventing the escape of air in directions parallel to said plane, and suitable means for directing a drying fluid such as air through the chamber and the material therein transversely to such predetermined plane of compression.

In its preferred form, such a drier may be made portable to function as a wagon to have the baled hay placed therein in the field, thence to deliver same to a suitable source of compressed air or other drying agent which may be coupled to an air supply and distributing means on the drier. In such preferred form the wagon box is utilized as the drying chamber, being provided with a perforated or foraminous bottom and imperforate upstanding marginal walls, one of which is laterally moveable, means being provided for laterally drawing such movable wall toward another of the walls of the chamber to laterally compress the hay, the air supplying and distributing means being disposed to direct the air vertically through the perforated bottom and of course through the hay or other material within the drying chamber.

It is a further object to provide a quite novel and simple means for incorporating an air supplying and distributing system within the frame work of the drying chamber, the several structural members of the frame being relied upon in large part to enclose and define such air supplying and distributing system.

The preferred form of apparatus for carrying out the process and for attaining the above enumerated objects and advantages is illustrated in the accompanying drawings in which:

Figure 1 represents a cross-section on the line 1—1 of Figure 2. In this view the drying apparatus is embodied in a more or less conventional wagon structure, one corner of which is shown in elevation.

Figure 2, a plan view of the apparatus shown in Figure 1;

Figure 3, a cross-section on the line 3—3 of Figure 1 looking in the direction of the arrows; and, Figure 4, an enlarged fragmentary section on the line 4—4 of Figure 2, looking in the direction of the arrows.

Referring now in detail to the accompanying drawings, the drier shown comprises a wheeled wagon frame or chassis consisting of the relatively spaced longitudinally disposed channel irons or beams 2—2 which are connected and rigidly held in their spaced relationship by a plurality of relatively longitudinally spaced cross-frame members, each designated 3, extending between and fixed to the respective beams 2—2. The several cross-members 3 may conveniently consists of channel irons of lesser vertical extent than the beams 2, the lower edges or extremities of the respective members 3, however, lying in a common plane with the lower edges of the said beams 2 as shown. Suitable brackets 4 depending from the beams 2 may support axles 5 on which are rotatably journalled the usual supporting wheels 6. Inasmuch as these wheels and their supporting means constitute no part of the instant invention but may be arranged in any conventional manner, they are but generally illustrated.

Supported on the cross-frame members 3 is a perforated or slotted floor comprising a plurality of relatively spaced longitudinally disposed slats 7, which may be of usual wooden construction, fixed to wooden cross-pieces 8 which respectively register with and are supported on the cross-frame members 3.

The air supplying and distributing system of the drier includes an upwardly opening air conduit in the form of a channel member 9 extending longitudinally beneath the cross-frame members 3 and means such as the laterally extending wings 10—10 extending from the sides of the conduit 9 to the respective means 2 and sealing the bottom of the wagon frame between the air conduit 9 and the supporting beams 2. Thus it will be seen that the frame and the conduit 9 jointly define a closed air chamber communicating with the perforated or slotted bottom 7 of the wagon through the spaces between the respective cross-members 3. It will be noted of course that the cross-members 3 at the extreme ends of the floor or bottom 7 are disposed to prevent the endwise escape of the air from such air chamber. In the embodiment shown, the front end of the conduit 9 is closed by an end piece 9' which may be seen in Figure 1, while the rear end thereof is left open whereby it may be coupled to any suitable source of air supply. When thus coupled to an air source and supplied with air under pressure, it will be seen that the conduit 9 and its associated frame structure directs the air vertically upwardly through the slotted or perforated floor 7.

Projecting upwardly from and marginally bounding the floor 7 are upstanding side walls 11—11 of usual construction and end walls 12 and 13 respectively. In the illustrated embodiment, the side walls and the rear end wall 12 are all relatively fixed in position and all of the walls are of imperforate substantially air impervious construction so that air flowing upwardly through the wagon bottom and through the material supported thereon will be prevented from escaping laterally, but will be laterally confined and caused to pass completely vertically through the wagon box or drying chamber and its contents.

In accordance with the invention any suitable arrangement may be provided whereby the material within the drying chamber or wagon box is compressed in a plane transverse to the path of air flow through the material. This requirement is satisfied in the instant embodiment by disposing the front end wall 13 of the wagon box for movement longitudinally thereof between the side walls 11—11. It will be noted that the front end wall 13 is supported on its lower edge for sliding movement over an imperforate plate 14 constituting a forward extension of the bottom 7, the longitudinal extent of the plate 14 being at least coextensive with the maximum range of longitudinal movement normally to be expected of the end wall 13. This is for the purpose of preventing the escape of air from the conduit 9 outside of the end wall 13 when the latter is in its operative position, as shown in Figure 1 in full lines, to compress a load of hay or other material within the drying chamber. Thus all of the air from the conduit 9 will be caused to pass through the wagon contents and will not be permitted to escape around the outside of end wall 13.

Endwise movement of the end wall 13 toward end wall 12 may be produced by any suitable mechanism. For purposes of exemplification such mechanism is shown as comprising a pair of upper and lower windlasses or winches 15 and 16 respectively which are similarly supported for rotation in bearings 17 and 18 fixed to the rear end of the wagon box. The lower windlass 16 has laterally spaced cables 19 extending therefrom longitudinally of the wagon box, the ends of these cables being anchored to the lower end portion of the movable end wall 13, as illustrated in Figure 1. Preferably these lower cables 19 are disposed at a level just below the upper surface of the floor 7, extending through the slots between adjoining floor slats 7. Thus the cables 19 may be moved freely and will not have the weight of the wagon contents resting thereon.

The upper windlass 15 similarly has a pair of laterally spaced cables 20—20 connected to the upper end edge of the movable end wall 13 as in Figure 1, the location of the windlass 15 and its said cables being at a level whereby the cables 20 may extend above the wagon contents. The ends of the cables 19 and 20 may be suitably anchored to their respective windlasses or winches in any suitable manner to be wound thereon responsive to rotation of the winches in their respective bearings. For instance as is exemplified in Figure 4 the cable 20 is anchored to its respective windlass 15 by means of a more or less conventional clamp structure 21. The windlass 15 is provided with a suitable operating lever whereby it may be manually rotated and also preferably has fixed thereon a ratchet 23 disposed for cooperation with a holding pawl 24 pivoted on a side extension plate 25 of the bracket which supports the bearing 17. The foregoing structure is clearly illustrated in Figure 4 of the drawings. The windlass 16 is similarly provided with an operating handle or a lever 26 and a holding pawl 27 cooperating with a ratchet 28 fixed on said winch 16.

Thus it will be obvious that the windlasses 15 and 16 may be manually actuated through rotary movement of their operating levers 22 and 26 respectively to draw the movable end wall 13 longitudinally of the wagon box toward the fixed end wall 12 to thereby longitudinally compress any material contained in the wagon box, causing the said material to expand somewhat against the side walls 11—11 and be confined thereby, so that the material is more or less compressed in all lateral directions.

To facilitate the loading of the wagon box the end wall 13 thereof is completely removable. To this end, the windlass cables terminate in eyes 19′ and 20′ respectively which are detachably connected to clevis members 29 on the end wall 13 by bolts 30 respectively disposed through each said eye and its associated clevis.

In the operation of the invention, with the end wall 13 removed in obvious manner, the wagon is drawn through a field of baled hay and the bales of hay may be stacked in the wagon box in the manner generally indicated in broken lines in Figure 1 wherein such bales are designated by the reference character H. Preferably these bales will be stacked in layers as shown, the longitudinal or major axis of the bales in each layer being disposed transversely to the major axis of the bales in adjoining layers so that the interstices between adjoining bales will be out of vertical registry. Also of course the bales are so arranged as to completely occupy the full width and length of the wagon body.

When the wagon body is completely filled, the end wall 13 is replaced and connected to the cables 19 and 20 in the position shown in broken lines in Figure 1. Then the windlasses 15 and 16 are actuated to draw the end wall 13 longitudinally of the wagon box to substantially the position shown in full lines in Figures 1 and 2 to thus compress the bales of hay into closely contiguous relationship. It will be readily apparent that the endwise or longitudinal compression of the bales will directly urge them together in longitudinal direction, while their resultant transverse expansion between the confining sidewalls 11—11 will similarly urge them transversely into closely contiguous relationship. Thus the interstices between the bales will be reduced to minimum size to very substantially restrict the passage of air therethrough.

Accordingly, when the wagon is then drawn to a source of air supply and air introduced under pressure into the conduit 9, such air will be forced to pass upwardly through the slotted or perforated floor 7 and, in view of the closely contiguous relationship of the respective bales, will be forced in large part to pass upwardly through the material within the respective bales, thus resulting in an extremely efficient and more rapid drying action than was heretofore obtainable in drying processes of the same general nature. Obviously instead of being coupled to a source of air under pressure, the rear end of the conduit 9 might be coupled to a vacuum to draw air downwardly vertically through the hay or alternatively other means may be utilized for forcing the air downwardly through the hay rather than upwardly.

In this application, we have shown and described merely the preferred embodiment of our invention simply by way of setting forth the best mode contemplated by us of carrying out our invention. However, we recognize that the preferred embodiment may be modified or its several details changed in various ways all without departing from the invention. Accordingly, the drawings and description herein are to be considered as merely illustrative in nature and not as exclusive.

Having thus described our invention, we claim:

1. A drier comprising a box having an open top, a perforated bottom and imperforate sides, means for directing air under pressure through said perforated bottom, and imperforate ends, one of said ends being stationary, the other said end being disposed for movement between the sides toward the stationary end, and mechanical means for causing such movement.

2. A drier comprising a box having an open top, a perforated bottom and imperforate sides and ends, means for directing air under pressure through said perforated bottom, said ends being relatively movable toward each other between said sides, and mechanical means for causing such movement.

3. A drier comprising a box having a perforated bottom and imperforate walls completely marginally surrounding said bottom, means for directing air under pressure through said perforated bottom, one of said walls being movable into said box, and mechanical means for causing such movement.

4. The combination of claim 1 in which the said bottom is imperforate coextensive with the range of movement of said movable end, whereby air may not be permitted to escape on the outer side of said end.

5. A hay drier comprising a drying chamber having a perforated bottom and imperforate upstanding marginal walls completely marginally surrounding said bottom, one of said walls being laterally movable over said bottom, in combination with means for laterally drawing said one wall toward another of said walls to laterally compress the hay within said chamber, and means for directing a drying fluid under pressure upwardly through said perforated bottom.

6. A drying wagon comprising a main frame including a pair of relatively spaced longitudinally disposed supporting beams, a plurality of relatively spaced cross frame members extending between and fixed to said beams, a perforated floor supported on said cross frame members, an upwardly opening conduit extending longitudinally beneath said cross frame members and communicating with the spaces between said members, and means sealing the bottom of said frame between said air conduit and said supporting beams, whereby said frame and said conduit jointly define a closed air chamber communicating with said perforated bottom to supply air therethrough, in combination with imperforate relatively opposed side and end walls disposed above and supported on said floor, one of said walls being movable over said floor, and mechanism for urging said wall over said floor toward its relatively opposed wall.

7. The combination of claim 6 in which the said floor comprises a plurality of longitudinally disposed slats supported in spaced relation on said cross-frame members.

8. The combination of claim 7 in which the said floor comprises a plurality of longitudinally disposed slats supported in spaced relation on said cross-frame members.

References Cited in the file of this patent
UNITED STATES PATENTS

| | | |
|---|---|---|
| 19,279 | Disbrow | Feb. 2, 1858 |
| 1,088,104 | Sharp | Feb. 24, 1914 |
| 1,726,373 | Voightlander | Aug. 27, 1929 |
| 2,439,853 | Moffett | Apr. 20, 1948 |
| 2,442,344 | Curtis | June 1, 1948 |